United States Patent
Solven et al.

(10) Patent No.: US 10,126,896 B2
(45) Date of Patent: Nov. 13, 2018

(54) SELECTIVE RECEIVER ELECTRODE SCANNING

(71) Applicant: Synaptics Incorporated, San Jose, CA (US)

(72) Inventors: Derek Solven, San Jose, CA (US); Jonathan Losh, San Jose, CA (US); Sanjay Mani, San Jose, CA (US); Matthew Stevenson, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 71 days.

(21) Appl. No.: 15/195,150

(22) Filed: Jun. 28, 2016

(65) Prior Publication Data

US 2017/0371443 A1 Dec. 28, 2017

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 2203/04101* (2013.01)

(58) Field of Classification Search
None
See application file for complete search history.

(56) References Cited

U.S. PATENT DOCUMENTS

| | | | | |
|---|---|---|---|---|
| 8,144,125 B2 * | 3/2012 | Peng | ..................... | G06F 3/044 178/18.01 |
| 8,421,772 B2 * | 4/2013 | Li | ..................... | G06F 3/0416 178/18.05 |
| 9,317,149 B2 * | 4/2016 | Kim | ..................... | G06F 3/041 |
| 2009/0115742 A1 * | 5/2009 | Mamba | .................. | G06F 3/044 345/174 |
| 2011/0157068 A1 * | 6/2011 | Parker | .................. | G06F 1/3203 345/174 |
| 2012/0050216 A1 * | 3/2012 | Kremin | .................. | G06F 3/044 345/174 |
| 2012/0169660 A1 * | 7/2012 | Seo | ..................... | G06F 1/3262 345/174 |
| 2013/0215049 A1 * | 8/2013 | Lee | ..................... | G06F 3/0416 345/173 |
| 2015/0309661 A1 * | 10/2015 | Kim | ..................... | G06F 3/0418 345/174 |

* cited by examiner

*Primary Examiner* — Srilakshimi K Kumar
*Assistant Examiner* — Karin Kiyabu
(74) *Attorney, Agent, or Firm* — Ferguson Braswell Fraser Kubasta PC

(57) ABSTRACT

A processing system, including: a sensor module that: receives, in a first sensing modality, first resulting signals from electrodes in a sensing region; and receives, in a second sensing modality, second resulting signals from a subset of receiver electrodes; and receiver hardware channels that process the second resulting signals, where the number of receiver electrodes exceeds the number of hardware channels; and a determination module that: measures a first plurality of capacitive changes based on the first resulting signals; determines, based on the first plurality of capacitive changes, the section of the sensing region in which an input object is located; selects the subset of the receiver electrodes corresponding to the section; measures a second plurality of capacitive changes based on the second resulting signals; and determines a position of the input object within the section based on the second plurality of capacitive changes.

18 Claims, 5 Drawing Sheets

SELECTIVE RECEIVER ELECTRODE SCANNING

TECHNICAL FIELD

This invention generally relates to electronic devices.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones). Proximity sensor devices may be used to detect finger, styli, or pens.

SUMMARY

In general, in one aspect, embodiments relate to a processing system for a capacitive sensing device. The processing system comprises: a sensor module that: receives, in a first sensing modality, a first plurality of resulting signals from a plurality of sensor electrodes in a sensing region; and receives, in a second sensing modality, a second plurality of resulting signals from a subset of a plurality of receiver electrodes, the subset of the plurality of receiver electrodes corresponding to a section of the sensing region; and a plurality of receiver hardware channels that process the second plurality of resulting signals, wherein the number of receiver electrodes exceeds the number of hardware channels; and a determination module that: measures a first plurality of capacitive changes based on the first plurality of resulting signals and the first sensing modality; determines, based on the first plurality of capacitive changes, the section of the sensing region in which an input object is located; selects the subset of the plurality of receiver electrodes corresponding to the section of the sensing region; measures a second plurality of capacitive changes based on the second plurality of resulting signals and the second sensing modality; and determines a position of the input object within the section based on the second plurality of capacitive changes.

In general, in one aspect, embodiments relate to a method for operating a capacitive sensing device associated with a sensing region. The method comprises: receiving, in a first sensing modality, a first plurality of resulting signals from a plurality of sensor electrodes in the sensing region; measuring a first plurality of capacitive changes based on the first plurality of resulting signals and the first sensing modality; determining, based on the first plurality of capacitive changes, a section of the sensing region in which an input object is located; selecting a subset of a plurality of receiver electrodes corresponding to the section of the sensing region; receiving, in a second sensing modality, a second plurality of resulting signals from the subset of the plurality of receiver electrodes; processing, by a subset of a plurality of receiver hardware channels, the second plurality of resulting signals, wherein the number of receiver electrodes exceeds the number of hardware channels; measuring a second plurality of capacitive changes based on the second plurality of resulting signals and the second sensing modality; and determining a position of the input object within the section based on the second plurality of capacitive changes.

In general, in one aspect, embodiments relate to an input device. The input device comprises: a plurality of transmitting electrodes in a sensing region; a plurality of receiver electrodes in the sensing region; and a processing system that: receives, in a first sensing modality, a first plurality of resulting signals from a plurality of sensor electrodes in the sensing region; measures a first plurality of capacitive changes based on the first plurality of resulting signals and the first sensing modality; determines, based on the first plurality of capacitive changes, a section of the sensing region in which an input object is located; selects a subset of the plurality of receiver electrodes corresponding to the section of the sensing region; receives, in a second sensing modality, a second plurality of resulting signals from a subset of a plurality of receiver electrodes; processes, by a subset of a plurality of receiver hardware channels, the second plurality of resulting signals, wherein the number of receiver electrodes exceeds the number of hardware channels; measures a second plurality of capacitive changes based on the second plurality of resulting signals and the second sensing modality; and determines a position of the input object within the section based on the second plurality of capacitive changes.

Other aspects of the embodiments will be apparent from the following description and the appended claims.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that may facilitate improved usability along with various other benefits.

Figure 1:
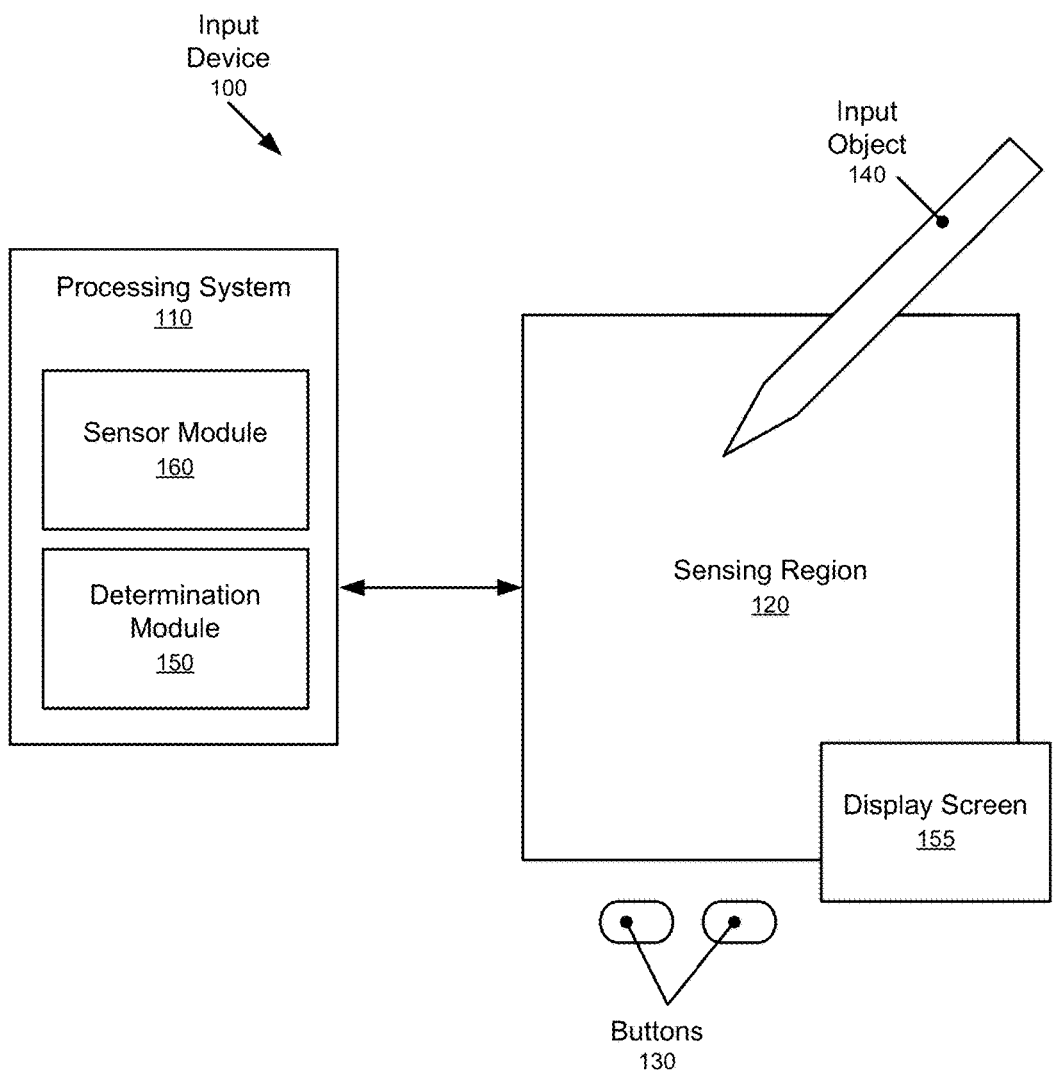
FIG. 1 and FIG. 2 show block diagrams of an input device in accordance with one or more embodiments.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) as part of the electronic system. For example, all or part of the determination module (150) may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects (140) include styli, pens, and fingers. Further, which particular input objects are in the sensing region may change over the course of one or more gestures. For example, a first input object may be in the sensing region to perform the first gesture, subsequently, the first input object and a second input object may be in the above surface sensing region, and, finally, a third input object may perform the second gesture. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may by a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g. other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows a determination module (150) and a sensor module (160), alternative or additional modules may exist in accordance with one or more embodiments. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen (155). For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen (155) may share physical elements. For example, some embodiments may utilize some of the same electrical components for displaying and sensing. In various embodiments, one or more display electrodes of a display device may configured for both display updating and input sensing. As another example, the display screen (155) may be operated in part or in total by the processing system (110).

It should be understood that while many embodiments are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer readable storage medium. Examples of non-transitory, electronically readable media include various discs, physical memory, memory, memory sticks, memory cards, memory modules, and or any other computer readable storage medium. Electronically readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the invention. For example, various components may be combined to create a single component. As another example, the functionality performed by a single component may be performed by two or more components.

As shown in FIG. 1, an input object (140) may be present in the sensing region (120). The one or more actions taken by the processing system (110) and/or the electronic system (not shown) connected to the input device (100) may depend on where the input object (140) is located. Accordingly, quickly determining the position of the input object (140) is important.

Figure 2:
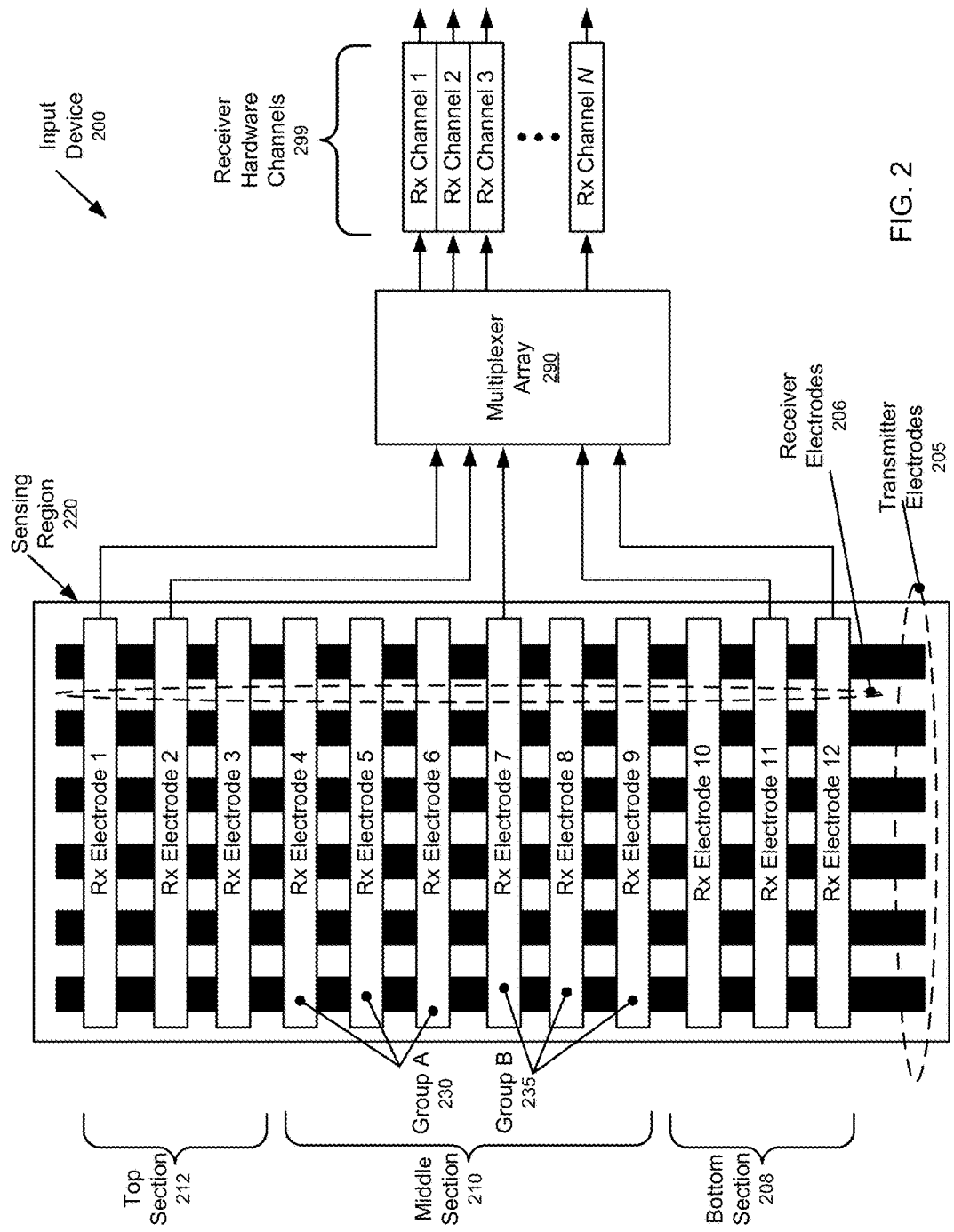

FIG. 2 shows an input device (200) in accordance with one or more embodiments. The input device (200) may be essentially the same as the input device (100), discussed above in reference to FIG. 1. As shown in FIG. 2, the input device (200) includes a sensing region (220), a multiplexer array (290), and multiple receiver hardware channels (299). The sensing region (220) may be essentially the same as the sensing region (120), discussed above in reference to FIG. 1. In one or more embodiments, the multiplexer array (290) and the receiver hardware channels (299) are components of the sensor module (160). In one or more embodiments, the multiplexer array (290) and/or the receiver hardware channels (299) are external to the sensor module (160).

In one or more embodiments, the sensing region (220) is partitioned into multiple sections (e.g., top section (212), middle section (210), and bottom section (208)). Each section (208, 210, 212) includes one or more receiver electrodes (206). For example, the top section (212) includes receiver electrode 1, receiver electrode 2, and receiver electrode 3. An another example, the bottom section (208) includes receiver electrode 10, receiver electrode 11, and receiver electrode 12. Within a single section, receiver electrodes (206) may be partitioned into groups. For example, receiver electrode 4, receiver electrode 5, and receiver electrode 6 are all members of Group A (230). As another example, receiver electrode 7, receiver electrode 8, and receiver electrode 9 are all members of Group B (235). Although the sections (208, 210, 212) are shown as non-overlapping, in one or more embodiments, two or more of the sections overlap (i.e., a receiver electrode may belong to two sections).

In one or more embodiments, the sensing region (220) includes transmitter electrodes (205). The transmitter electrodes (205) and the receiver electrodes (206) may implement transcapacitance sensing. Transcapacitance sensing is an example of a sensing modality. As discussed above, by using transcapacitance sensing, the position of the input object (140) within the sensing region (220), and more specifically, within a section (208, 210, 212), may be determined.

In one or more embodiments, the sensing region (220) includes sensor electrodes that are used for absolute capacitance sensing. Absolute capacitance sensing is an example of a sensing modality. In one or more embodiments, the sensor electrodes are the receiver electrodes (206). In other words, the receiver electrodes (206) may be used for both transcapacitance sensing and absolute capacitance sensing. In one or more embodiments, the sensor electrodes are other electrodes in the sensing region (220) not shown in FIG. 2. By using absolute capacitance sensing, it is possible to determine the section (208, 210, 212) in which the input object (140) is located.

In one or more embodiments, the transmitter electrodes (205) and the receiver electrodes (206) implement transcapacitance projection sensing. Transcapacitance projection sensing is an example of a sensing modality. In transcapacitance projection sensing, one or more signals are driven onto all or a subset of the transmitter electrodes (205). An input object near a receiving electrode (e.g., Rx electrode 2) alters the electric field between the receiving electrode and the multiple transmitter electrodes, thus changing the measured capacitive coupling between the receiver electrode and the multiple transmitter electrodes. Like absolute capacitance sensing, transcapacitance projection sensing may be used to determine the section (208, 210, 212) in which the input object (140) is located.

Those skilled in the art, having the benefit of this detailed description, will appreciate that although the position of the input object (140) within a single section can be determined using transcapacitance sensing, transcapacitance sensing takes longer to execute than absolute capacitance sensing or transcapacitance projection sensing.

In one or more embodiments, absolute capacitance sensing or transcapacitance projection sensing is first used to determine the section (208, 210, 212) in which the input object (140) is located. In other words, absolute capacitance sensing is performed for the entire sensing region (220). Then, transcapacitance sensing may be used only within the section (i.e., using a subset of the receiver electrodes (206)) to determine the position of the input object (140) within the section. In other words, transcapacitance sensing is only performed for a portion of the entire sensing region (220).

In one or more embodiments, the input device (200) includes multiple hardware receiver channels (299). Each of the hardware receiver channels (299) includes circuitry to process a resulting signal from an electrode (e.g., a receiver electrode, a sensor electrode, etc.). Accordingly, each of the hardware receiver channels (299) may include an integrator and an analog-to-digital convertor (ADC). The hardware receiver channels (299) may execute on resulting signals in parallel.

In one or more embodiments, the number of receiver electrodes (206) exceeds the number in hardware receiver channels (299). For example, the number of hardware receiver channels (299) may only equal the number of receiver electrodes in a single section (208, 210, 212). If one of the hardware receiver channels (299) is not being used, it may be placed in a low power mode to reduce the power (e.g., battery) being consumed by the input device (200).

In one or more embodiments, the input device (200) includes the multiplexer array (290). The multiplexer array (290) includes one or more multiplexers that couple the receiver electrodes (206) to the hardware receiver channels (299). When it is determined that the input object (140) is located within a section of the sensing region (220) (e.g., using absolute capacitance sensing), the multiplexer array (290) may actively couple the subset of receiver electrodes (206) corresponding to that section to the hardware receiver channels (299). In one or more embodiments, electrode groups (230, 235) from the same section may be connected to different multiplexers within the multiplexer array (290). Those skilled in the art, having the benefit of this detailed description, will appreciate that if the number of hardware receiver channels is greater than or equal to the number of receiver electrodes (206), the multiplexer array (290) may be optional.

Although FIG. 2 shows twelve receiver electrodes (206) and six transmitter electrodes (205), the sensing region (220) may be of any size and thus the input device (200) may have any number of transmitter and receiver electrodes.

Figure 3:
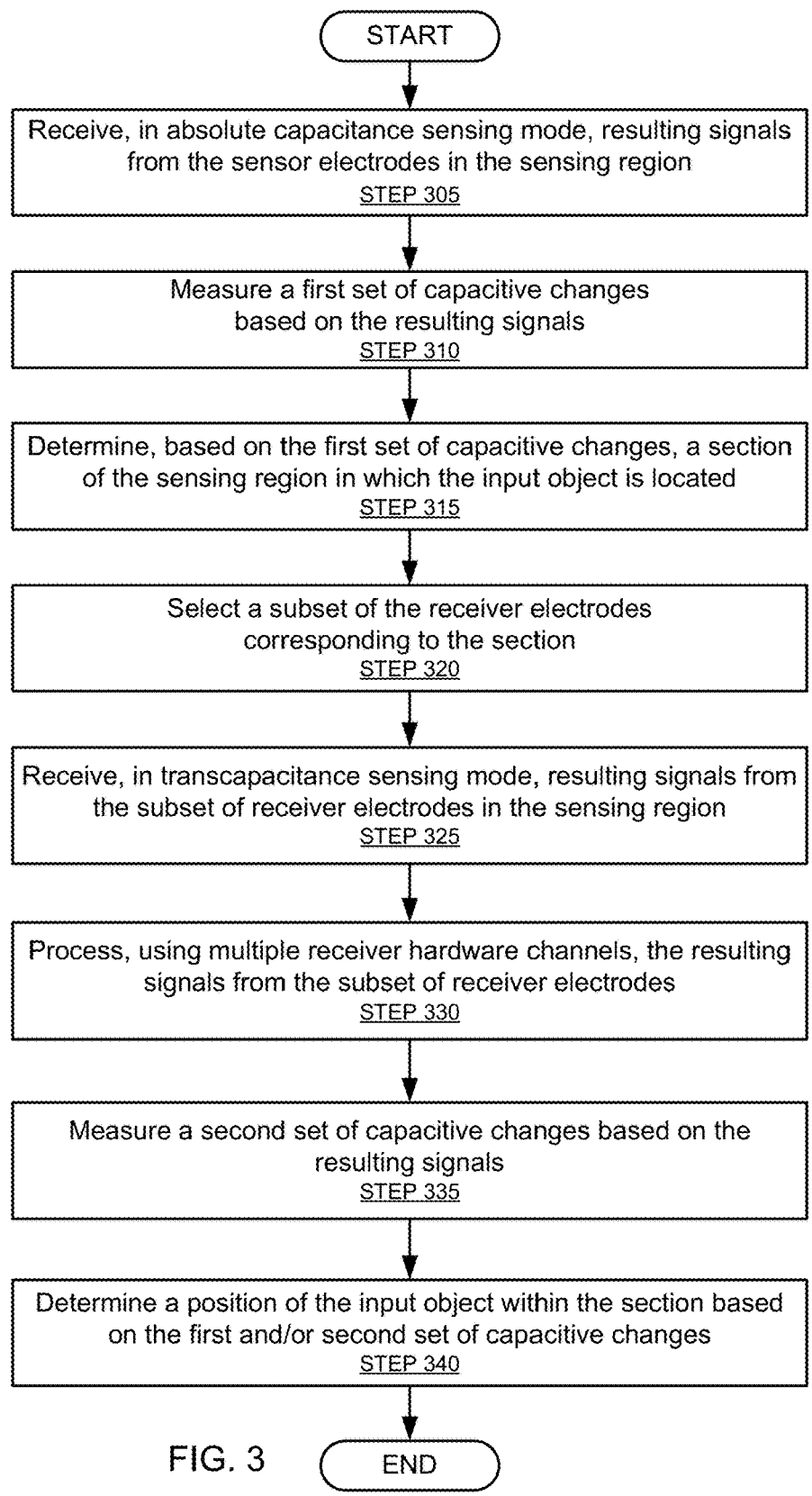
FIG. 3 shows a flowchart in accordance with one or more embodiments.

FIG. 3 shows a flowchart in accordance with one or more embodiments. The flowchart depicts a process for operating a capacitive sensing device associated with a sensing region. One or more of the steps in FIG. 3 may be performed by the components of the input system (200) or input system (100), discussed above in reference to FIG. 2 and FIG. 1, respectively. In one or more embodiments, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

Initially, resulting signals from sensor electrodes are received (STEP 305). The resulting signals may be received by a sensor module while an input device is operating in an absolute capacitance sensing mode.

In STEP 310, a first set of capacitive changes are measured based on the resulting signals. Specifically, a capacitive change may be measured for each sensor electrode. In STEP 315, the section of the sensing region in which the input object is located is determined. As discussed above, the sensing region may be partitioned into multiple sections and there may be one or more sensor electrodes per section. In one or more embodiment, the section with the sensor electrodes showing the greatest amount of capacitive change is the section where the input object is located. Additionally or alternatively, any section that shows a significant change in capacitance may have part of input object or the entire input object.

In STEP 320, a subset of the receiver electrodes is selected. Specifically, the subset of receiver electrodes corresponding to the section(s) is selected. This subset may be selected by actively coupling (e.g., using a multiplexer) the subset of receiver electrodes to hardware receiver channels, with one hardware receiver channel per receiver electrode. The number of hardware receiver channels may equal the number of receiver electrodes in the subset. As also discussed above, the receiver electrodes and the sensor electrodes may be the same electrodes.

In STEP 325, resulting signals from the subset of receiver electrodes are received. The resulting signals may be received by the sensor module while the input device is operating in a transcapacitance sensing mode (i.e., a different sensing modality than the sensing modality in STEP 305). However, transcapacitance sensing is not being performed over the entire sensing region. The transcapacitance sensing is only being performed for the section(s) in which the input object is located.

In STEP 330, the received resulting signals are processed in parallel by the hardware receiver channels. Each hardware receiver channel may include an integrator and an ADC.

In STEP 335, a second set of capacitive changes are measured based on the resulting signals. Specifically, a capacitive change may be measured for each transmitter electrode and receiver electrode intersection within the section(s) of the sensing region. In STEP 340, the position of the input object within the section(s) is determined. Specifically, the intersection or the collection of intersections with the greatest chance in capacitance may be deemed to be the position of the input object.

Although FIG. 3 only mentions a single input object, one or more steps in FIG. 3 may be repeated to determine the positions of multiple input objects.

Figure 4:
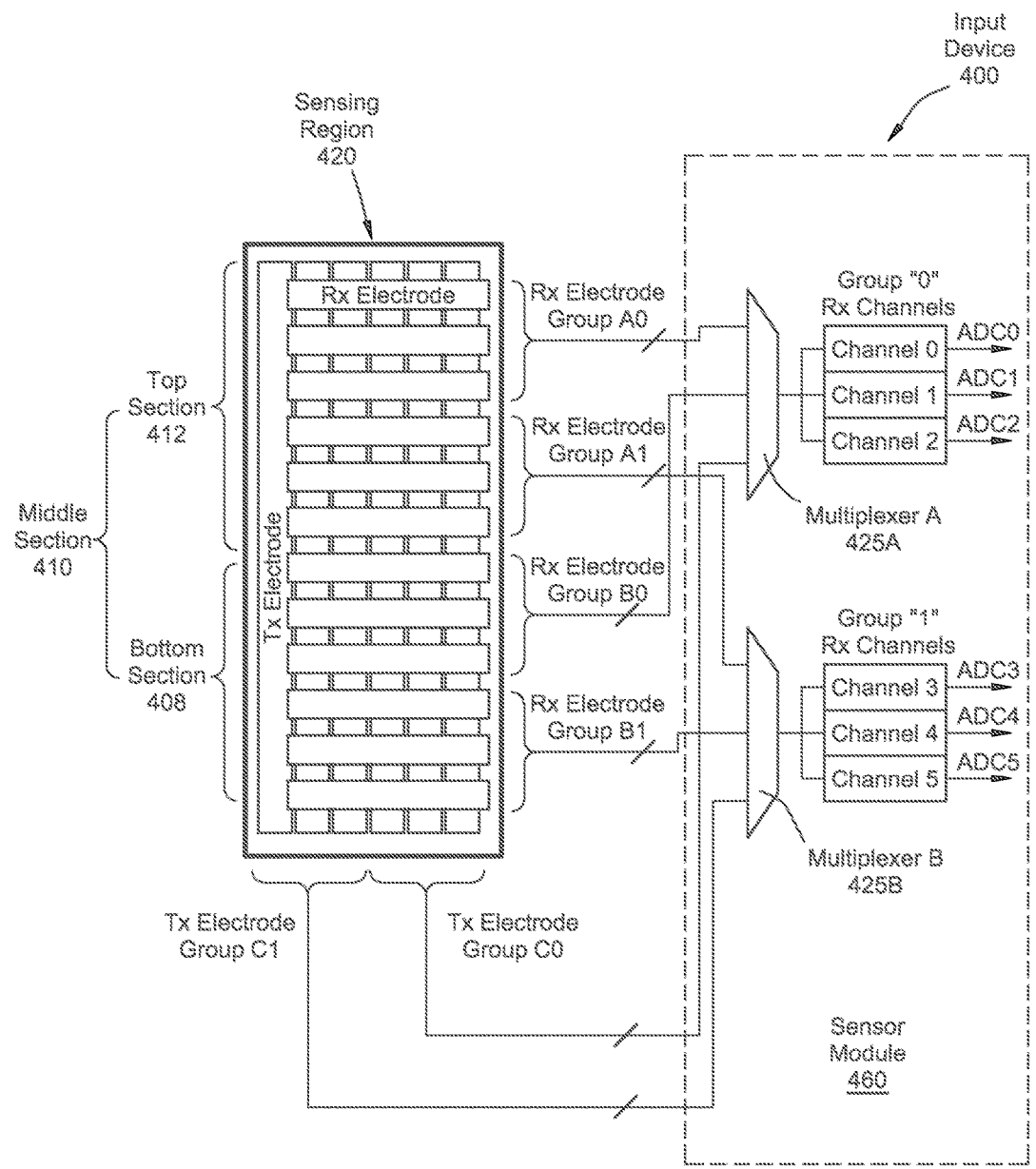
FIG. 4 shows an example implementation in accordance with one or more embodiments.

FIG. 4 shows an implementation example in accordance with one or more embodiments. In FIG. 4, there exists an input device (400) having a sensing region (420) and a sensor module (460). The input device (400), the sensing region (420), and the sensor module (460), may be essentially the same as the input device (200), the sensing region (220), and the sensor module (160), respectively, discussed above in reference to FIG. 1 and FIG. 2.

In one or more embodiments, the sensing region (420) is partitioned into a top section (412), a middle section (410), and a bottom section (408). As shown in FIG. 4, the sections are overlapping. Moreover, each section has multiple groups of receiving electrodes. For example, the top section (412) has receiver electrode group A0 and receiver electrode group A1. As another example, the bottom section has receiver electrode group B0 and receiver electrode group B1. As yet another example, the middle section (410) has receiver electrode group A1 and receiver electrode group B0.

In one or more embodiments, the sensor module (460) includes six hardware receiver channels (i.e., Channel 0, Channel 1, . . . , Channel 5) and two multiplexers (i.e., Multiplexer A (425A) and Multiplexer B (425B)). The two multiplexers (425A, 425B) may be located in a multiplexer array (not shown). The receiver electrode groups of each section are connected to different multiplexers. For example, receiver electrode group A0 and receiver electrode group A1, both belonging to the top section (412), are connected to multiplexer A (425A) and multiplexer B (425B), respectively. Similarly, receiver electrode group A1 and receiver electrode group B0, both belong to the middle section (410), are connected to multiplexer B (425B) and multiplexer A (425A), respectively.

Figure 5:
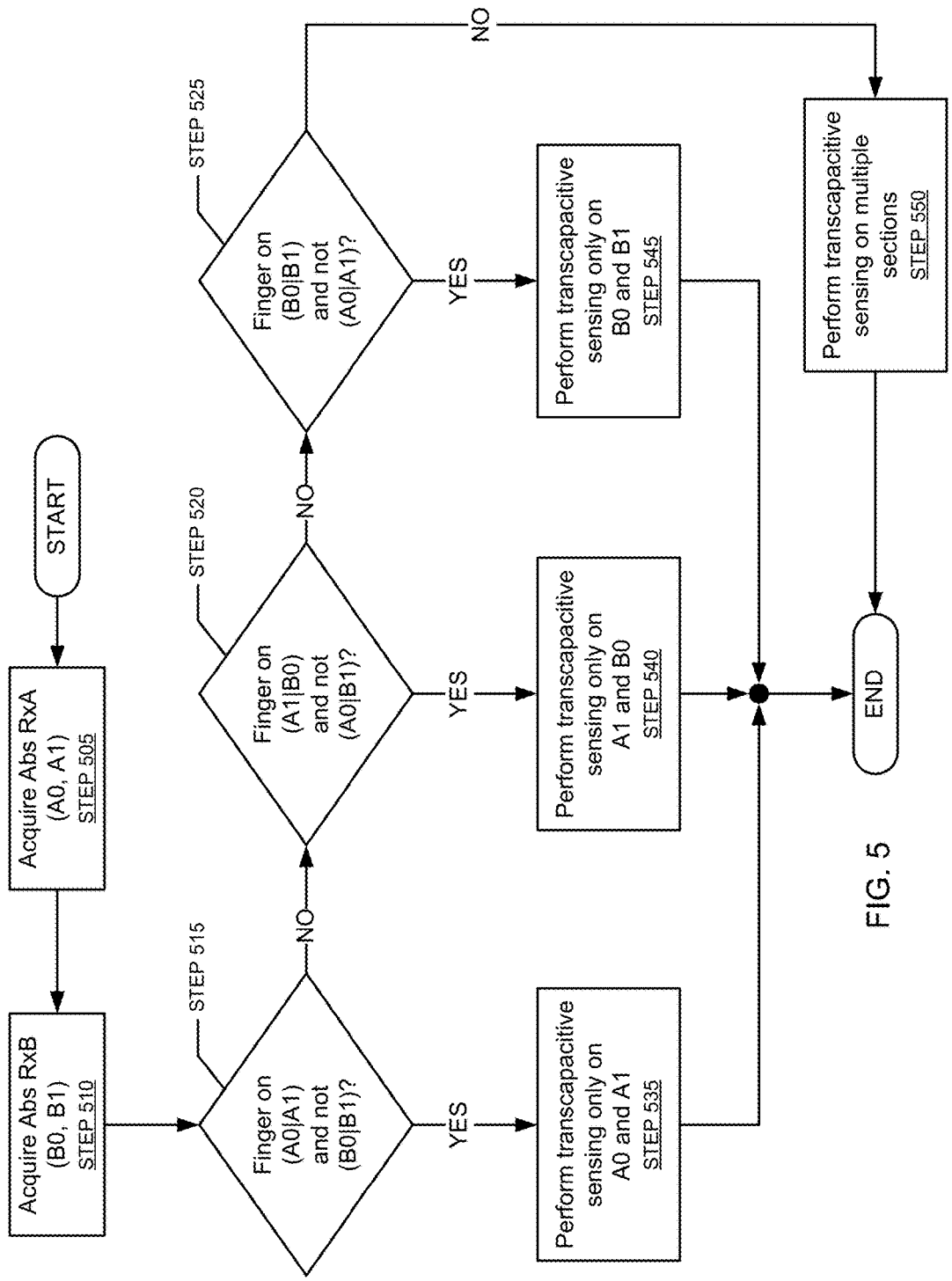
FIG. 5 shows a flowchart in accordance with one or more embodiments.

FIG. 5 shows a flowchart in accordance with one or more embodiments. The flowchart of FIG. 5 corresponds to the input device (400) of FIG. 4. Specifically, the flowchart depicts a process for operating the input device (400) associated with the sensing region (420). One or more of the steps in FIG. 5 may be performed by the components of the input system (400) or input system (100), discussed above in reference to FIG. 4 and FIG. 1, respectively. In one or more embodiments, one or more of the steps shown in FIG. 5 may be omitted, repeated, and/or performed in a different order than the order shown in FIG. 5. Accordingly, the scope of the invention should not be considered limited to the specific arrangement of steps shown in FIG. 5.

Initially, the measured change in absolute capacitance for each electrode in group A0 and group A1 is acquired (STEP 505). In STEP 510, the measured change in absolute capacitance for each receiver electrode in group B0 and group B1 is acquired.

In STEP 515, it is determined whether the input object (e.g., finger) is located in the top section (412). In other words, it is determined whether the measured change in absolute capacitance for any receiver electrode in group A0 or group A1 (but not the other groups) is sufficiently large to deem the finger is located in the top section (412). When it is determined that the finger is in the top section (412), and no objects of interest are located in other non-overlapping sections, transcapacitance sensing is performed only in the top section (not the middle or bottom section) (STEP 535) to determine the position of the finger in the top section. Because group A0 and group A1 are connected to different multiplexers (425A, 425B), the receiver hardware channels may process the resulting signals from the transcapacitance sensing in parallel.

In STEP 520, it is determined whether the input object (e.g., finger) is located in the middle section (410). In other words, it is determined whether the measured change in absolute capacitance for any receiver electrode in group A1 or group B0 (but not the other groups) is sufficiently large to deem the finger is located in the middle section (410). When it is determined that the finger is in the middle section (410), and no objects of interest are located in other non-overlapping sections, transcapacitance sensing is performed only in the middle section (not the top or bottom section) (STEP 540) to determine the position of the finger in the middle section. Because group A1 and group B0 are connected to different multiplexers (425A, 425B), the receiver hardware channels may process the resulting signals from the transcapacitance sensing in parallel.

In STEP 525, it is determined whether the input object (e.g., finger) is located in the bottom section (408). In other words, it is determined whether the measured change in absolute capacitance for any receiver electrode in group B0 or group B1 (but not the other groups) is sufficiently large to deem the finger is located in the bottom section (408). When it is determined that the finger is in the bottom section (408), and no objects of interest are located in other non-overlapping sections, transcapacitance sensing is performed only in the bottom section (not the top or the middle section) (STEP 545) to determine the position of the finger in the bottom section. Because group B0 and group B1 are connected to different multiplexers (425A, 425B), the receiver hardware channels may process the resulting signals from the transcapacitance sensing in parallel.

Otherwise, in STEP 550, transcapacitance sensing is performed in multiple sections. For example, if the input object is large and spans the entire sensing region (and thus all sections), transcapacitance sensing is performed for the entire sensing region. As another example, if there are multiple input objects and each section has at least one of the input objects, transcapacitance sensing is performed for the entire sensing region. As yet another example, if the input object(s) is located in two or more sections but not all of the sections, transcapacitance sensing is performed only for the two or more sections.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A processing system for a capacitive sensing device, comprising:
    a sensor module comprising circuitry configured to:
        receive, in a first sensing modality, a first plurality of resulting signals from a plurality of sensor electrodes in a sensing region, the sensing region partitioned into a plurality of sections comprising:
            a first section comprising a plurality of receiver electrode groups; and
            a second section comprising a first receiver electrode group and a second receiver electrode group; and
        receive, in a second sensing modality, a second plurality of resulting signals from a subset of a plurality of receiver electrodes, the subset of the plurality of receiver electrodes corresponding to the second section of the sensing region;
    a first multiplexer coupled to one of the plurality of receiver electrode groups and the first receiver electrode group;
    a second multiplexer coupled to one of the plurality of receiver electrode groups and the second receiver electrode group,
    wherein the number of multiplexers equals the number of receiver electrode groups in the second section;
    a plurality of receiver hardware channels comprising:
        a first set of receiver hardware channels coupled to the first multiplexer and comprising circuitry configured to process, in parallel, a first subset of the second plurality of resulting signals corresponding to the first receiver electrode group; and
        a second set of receiver hardware channels coupled to the second multiplexer and comprising circuitry configured to process, in parallel, a second subset of the second plurality of resulting signals corresponding to the second receiver electrode group,
    wherein the number of receiver electrodes exceeds the number of receiver hardware channels, and
    wherein the number of receiver hardware channels in the first set equals the number of receiver electrodes in the first receiver electrode group coupled to the first multiplexer; and
    a determination module comprising circuitry configured to:
        measure a first plurality of capacitive changes based on the first plurality of resulting signals and the first sensing modality;
        determine, based on the first plurality of capacitive changes, an input object is located in the second section;
        actively couple, using the first multiplexer and the second multiplexer, the subset of the plurality of receiver electrodes corresponding to the second section of the sensing region to the plurality of receiver hardware channels in response to determining the input object is in the second section;
        measure a second plurality of capacitive changes based on the second plurality of resulting signals and the second sensing modality; and
        determine a position of the input object within the second section based on the second plurality of capacitive changes.

2. The processing system of claim 1, wherein the determination module comprising circuitry is configured to determine the position of the input object within the second section based on the first plurality of capacitive changes.

3. The processing system of claim 1, wherein the sensor module comprising circuitry is configured to:
    drive, in the second sensing modality, a plurality of transmitter electrodes,
    wherein the second sensing modality is transcapacitance sensing.

4. The processing system of claim 3, wherein the sensor module comprising circuitry is configured to:
    drive, in the first sensing modality, the plurality of transmitter electrodes,
    wherein the first sensing modality is transcapacitance projection sensing.

5. The processing system of claim 3, wherein the first sensing modality is absolute capacitance sensing.

6. The processing system of claim 1, wherein the first plurality of capacitive changes comprise capacitive changes over a first portion of the sensing region, wherein the second plurality of capacitive changes comprise capacitive changes over a second portion of the sensing region, and wherein the second portion is smaller than the first portion.

7. A method for operating a capacitive sensing device associated with a sensing region, comprising:
    receiving, in a first sensing modality, a first plurality of resulting signals from a plurality of sensor electrodes in the sensing region, the sensing region partitioned into a plurality of sections comprising:
        a first section comprising a plurality of receiver electrode groups; and
        a second section comprising a first receiver electrode group and a second receiver electrode group;
    measuring a first plurality of capacitive changes based on the first plurality of resulting signals and the first sensing modality;
    determining, based on the first plurality of capacitive changes, an input object is located in the second section;
    actively coupling, using a plurality of multiplexers, a subset of a plurality of receiver electrodes corresponding to the second section of the sensing region to a plurality of receiver hardware channels in response to determining the input object is located in the second section, wherein the plurality of multiplexers comprises:
  a first multiplexer coupled to one of the plurality of receiver electrode groups and the first receiver electrode group;
  a second multiplexer coupled to one of the plurality of receiver electrode groups and the second receiver electrode group,
wherein the number of multiplexers equals the number of receiver electrode groups in the second section;
receiving, in a second sensing modality, a second plurality of resulting signals from the subset of the plurality of receiver electrodes;
processing, by the plurality of receiver hardware channels, the second plurality of resulting signals,
wherein the plurality of receiver hardware channels comprises:
  a first set of receiver hardware channels coupled to the first multiplexer and comprising circuitry configured to process, in parallel, a first subset of the second plurality of resulting signals corresponding to the first receiver electrode group; and
  a second set of receiver hardware channels coupled to the second multiplexer and comprising circuitry configured to process, in parallel, a second subset of the second plurality of resulting signals corresponding to the second receiver electrode group,
wherein the number of receiver hardware channels in the first set equals the number of receiver electrodes in the first receiver electrode group coupled to the first multiplexer, and
wherein the number of receiver electrodes exceeds the number of receiver hardware channels;
measuring a second plurality of capacitive changes based on the second plurality of resulting signals and the second sensing modality; and
determining a position of the input object within the second section based on the second plurality of capacitive changes.

8. The method of claim 7, further comprising:
driving, in the second sensing modality, a plurality of transmitter electrodes,
wherein the second sensing modality is transcapacitance sensing.

9. The method of claim 8, further comprising:
driving, in the first sensing modality, the plurality of transmitter electrodes,
wherein the first sensing modality is transcapacitance projection sensing.

10. The method of claim 7, wherein the first plurality of capacitive changes comprise capacitive changes over a first portion of the sensing region, wherein the second plurality of capacitive changes comprise capacitive changes over a second portion of the sensing region, and wherein the second portion is smaller than the first portion.

11. An input device, comprising:
a sensing region partitioned into a plurality of sections comprising:
  a first section comprising a plurality of receiver electrode groups; and
  a second section comprising a first receiver electrode group and a second receiver electrode group;
a plurality of transmitting electrodes in the sensing region;
a plurality of receiver electrodes distributed among the plurality of sections; and
a processing system comprising:
  a plurality of multiplexers comprising:
    a first multiplexer coupled to one of the plurality of receiver electrode groups and the first receiver electrode group; and
    a second multiplexer coupled to one of the plurality of receiver electrode groups and the second receiver electrode group,
  wherein the number of multiplexers equals the number of receiver electrode groups in the second section;
  a plurality of receiver hardware channels comprising:
    a first set of receiver hardware channels coupled to the first multiplexer; and
    a second set of receiver hardware channels coupled to the second multiplexer,
  wherein the number of receiver hardware channels in the first set equals the number of receiver electrodes in the first receiver electrode group coupled to the first multiplexer; and
  circuitry configured to:
    receive, in a first sensing modality, a first plurality of resulting signals from a plurality of sensor electrodes in the sensing region;
    measure a first plurality of capacitive changes based on the first plurality of resulting signals and the first sensing modality;
    determine, based on the first plurality of capacitive changes, an input object is located in the second section;
    actively couple, using the first multiplexer and the second multiplexer, a subset of the plurality of receiver electrodes corresponding to the second section of the sensing region to the plurality of receiver hardware channels in response to determining the input object is located in the second section;
    receive, in a second sensing modality, a second plurality of resulting signals from the subset of the plurality of receiver electrodes;
    process, by the first set and the second set of receiver hardware channels, the second plurality of resulting signals,
    wherein the first set of receiver hardware channels is configured to process, in parallel, a first subset of the second plurality of resulting signals corresponding to the first receiver electrode group,
    wherein the second set of receiver hardware channels is configured to process, in parallel, a second subset of the second plurality of resulting signals corresponding to the second receiver electrode group, and
    wherein the number of receiver electrodes exceeds the number of receiver hardware channels;
    measure a second plurality of capacitive changes based on the second plurality of resulting signals and the second sensing modality; and
    determine a position of the input object within the second section based on the second plurality of capacitive changes.

12. The input device of claim 11, wherein the processing system further comprises circuitry configured to:
drive, in the second sensing modality, the plurality of transmitting electrodes,
wherein the second sensing modality is transcapacitance sensing, and
wherein the first sensing modality is absolute capacitance sensing.

13. The input device of claim 11, wherein the first plurality of capacitive changes comprise capacitive changes over a first portion of the sensing region, wherein the second plurality of capacitive changes comprise capacitive changes over a second portion of the sensing region, and wherein the second portion is smaller than the first portion.

14. The processing system of claim 1, wherein:
the plurality of sections further comprise a third section;
the second section partially overlaps with the first section and the first receiver electrode group belongs to both the first section and the second section; and
the second section partially overlaps with the third section and the second receiver electrode group belongs to both the second section and the third section.

15. The processing system of claim 1, wherein at least one of the plurality of receiver hardware channels comprises an integrator and an analog-to-digital converter (ADC).

16. The method of claim 7, wherein:
the plurality of sections further comprise a third section;
the second section partially overlaps with the first section and the first receiver electrode group belongs to both the first section and the second section; and
the second section partially overlaps with the third section and the second receiver electrode group belongs to both the second section and the third section.

17. The input device of claim 11, wherein:
the plurality of sections further comprise a third section;
the second section partially overlaps with the first section and the first receiver electrode group belongs to both the first section and the second section; and
the second section partially overlaps with the third section and the second receiver electrode group belongs to both the second section and the third section.

18. The input device of claim 11, wherein at least one of the plurality of receiver hardware channels comprises an integrator and an analog-to-digital converter (ADC).

* * * * *